United States Patent [19]

Pellerito

[11] Patent Number: 5,290,057
[45] Date of Patent: Mar. 1, 1994

[54] TRAILOR HITCH

[76] Inventor: Alexander M. Pellerito, 1975 SW. 116th Ave., Davie, Fla. 33325

[21] Appl. No.: 626,681

[22] Filed: Dec. 10, 1990

[51] Int. Cl.⁵ .......................... B60D 1/06; B60D 1/28
[52] U.S. Cl. ..................................... 280/507; 280/511
[58] Field of Search ............ 280/511, 506, 507, 491.5

[56] References Cited

U.S. PATENT DOCUMENTS

| | | | |
|---|---|---|---|
| 4,230,336 | 10/1980 | Avrea et al. | 280/507 |
| 4,433,854 | 2/1984 | Smith | 280/511 |
| 4,542,914 | 9/1985 | Shropshire | 280/507 |
| 4,596,406 | 6/1986 | Van Vleet et al. | 280/511 |
| 4,938,496 | 7/1990 | Thomas et al. | 280/511 |

Primary Examiner—David M. Mitchell
Assistant Examiner—Kevin Hurley
Attorney, Agent, or Firm—Harrison & Egbert

[57] ABSTRACT

An improved ball and socket-type coupling adapted to provide a tamperproof coupling between a tow arm of a towed vehicle and a support member of a towing vehicle, the socket thereof having a dome shaped portion adapted to embrace the ball in a conventional manner, said ball being connected to said support member by a bolt means, said bolt means having an upper non-threaded shank, a lower non-threaded shank, an intermediate threaded portion, and a bolt head connected to said lower shank remote from said intermediate threaded portion, said upper shank defining a transverse aperture therethrough passing through the axis of rotation of said bolt, a nut means having threads corresponding with said intermediate threaded portion of said bolt adapted to mesh therewith so as to sandwich said support member between said bolt head and said nut means, said ball defining a partially hollow interior opening downwardly, said ball further defining a transverse aperture therethrough intersecting said hollow interior at a right angle, said transverse aperture of said ball adapted to align coaxially with the transverse aperture of said upper shank to form a keyway, and pin means adapted to be placed through said keyway to prevent movement of said ball relative to said upper shank.

9 Claims, 2 Drawing Sheets

TRAILOR HITCH

BACKGROUND OF THE INVENTION

1. Field of the Invention

This invention relates generally to couplings of the ball and socket type used for towing vehicles and more particularly relates to a tamper-proof trailer hitch ball and ball mounting assembly.

2. Description of the Prior Art

Numerous examples of tamper-proof coupling arrangements for joining a towed vehicle with a towing vehicle have been proposed, wherein a portion of such coupling is permanently mounted upon the rear of the towing vehicle and a mating portion thereof permanently connected to the leading end of the towed vehicle. Perhaps the most common of these is the familiar ball and socket coupling apparatus, which is typically comprised of a ball component affixed to the towing vehicle and a socket element affixed to the towed vehicle. Included in the coupler is a manually operable clamping arrangement which retains the ball within the socket to thereby articulatedly interconnect the towed and the towing vehicles.

Frequently the two vehicles joined by the coupling apparatus are stored or left unattended for extended periods of time. During such periods, the risk of theft of the towed vehicle is a source of general concern. Certain anti-theft precautions have been evolved by vehicle operators. For example, it is common practice to pass a chain between the towing vehicle and the towed vehicle and secure the chain with a padlock. Such chains have proven to be relatively ineffective because a chain link may be quickly severed by cutting or sawing.

In other instances, the ball is welded to the towing vehicle. However, such permanent attachment of the ball component is highly impractical because towed vehicles are equipped with couplers having variously sized sockets. Accordingly, it is desirable to be able to rapidly replace one ball with another.

An arrangement is presently in use wherein the ball may be removed from the bolt which connects it to the towing vehicle and replaced by one of a different size. To accomplish this, a pin is passed through an aperture disposed transversely through the ball and also through a correspondingly positioned and sized aperture in the bolt. As presently used, however, the bolt is provided with a threaded lower end over which a securing nut and lock washer are threaded to connect the ball and bolt arrangement to the towed vehicle. By simply removing the nut, the bolt, ball and trailer may be removed from the towed vehicle and connected to another vehicle.

Accordingly, it is a principal object of the present invention to provide a trailer hitch which can be used in a conventional manner and which provides for the prevention of unauthorized use of the towed vehicle.

It is another object of the present invention to provide a trailer hitch which adds additional safety features to the connection between the towing vehicle and the towed vehicle.

It is another object of the present invention to provide a coupling apparatus having theft retarding means.

It is still a further object of the present invention to provide an improved ball component of a coupling apparatus having a locking element, which, under certain conditions, prevents removal of the attachment bolt.

Still another object of this invention is the provision of an improved coupling apparatus in which the ball component cannot be removed from the support member when engaged with the coupling component.

Still another object of the present invention is to provide anti-theft improvements to a ball and socket coupling apparatus which are compatible with commercially available prior art coupling apparatus.

In accordance with these and other objects which will be apparent hereinafter, the instant invention will now be described with particular reference to the accompanying drawings.

SUMMARY OF THE INVENTION

The invention is comprised of a locking member in the form of a bolt having an elongated body member and a head at one end thereof. The body member of the bolt is comprised of an upper, non-threaded, shank, an intermediate threaded portion and a lower, non-threaded, shank connected between the intermediate threaded portion and the head. A transverse bore is formed horizontally through the upper shank and passes through the axis of rotation of the bolt.

The bolt is adapted to be passed upwardly, upper shank first, through a bore disposed in the support member of the towing vehicle so that the upper shank and at least a portion of the intermediate threaded portion extend above an upper surface of the support member and the head engages in operative association a lower surface of the support member.

The invention further specifies an internally threaded nut member adapted to be threaded upon the intermediate threaded portion so as to firmly engage the upper surface of the support member. A spherical ball having a partially hollow interior opening downwardly is adapted to be placed upon the upper shank of the bolt and to abut the top end of said nut in a manner such that a transverse aperture disposed through the ball aligns with the transverse bore in the upper shank of the bolt. A removable pin member is thereafter passed through a keyway formed by the aligned aperture in said ball with the bore in the upper shank of the bolt.

In this way, the nut is firmly wedged between the lower end of the ball and the upper surface of the support member such that any effort to rotate the bolt head will be resisted by high friction forces at the ball/nut and nut/support member interfaces, and removal of the ball prevented. When the socket member of the towed vehicle is locked to the ball in the conventional manner, it becomes virtually impossible to remove the ball from the bolt and it consequently becomes impossible to steal the towed vehicle. The only way that the bolt can be removed from the support member is to remove the socket member from engagement about the ball, remove the pin means from the keyway, remove the ball and unscrew and remove the nut. None of the aforementioned can be accomplished while the socket member of the towed vehicle is secured to the ball.

No modification to the socket member is required. Thus, the instant invention provides an inexpensive and simple to substitute ball member of a ball and socket coupling arrangement which drastically reduces the chances that a towed vehicle (e.g.: boat trailer) can be disconnected from coupled association with a towing vehicle.

DETAILED DESCRIPTION OF THE PREFERRED EMBODIMENT

Figure 1:
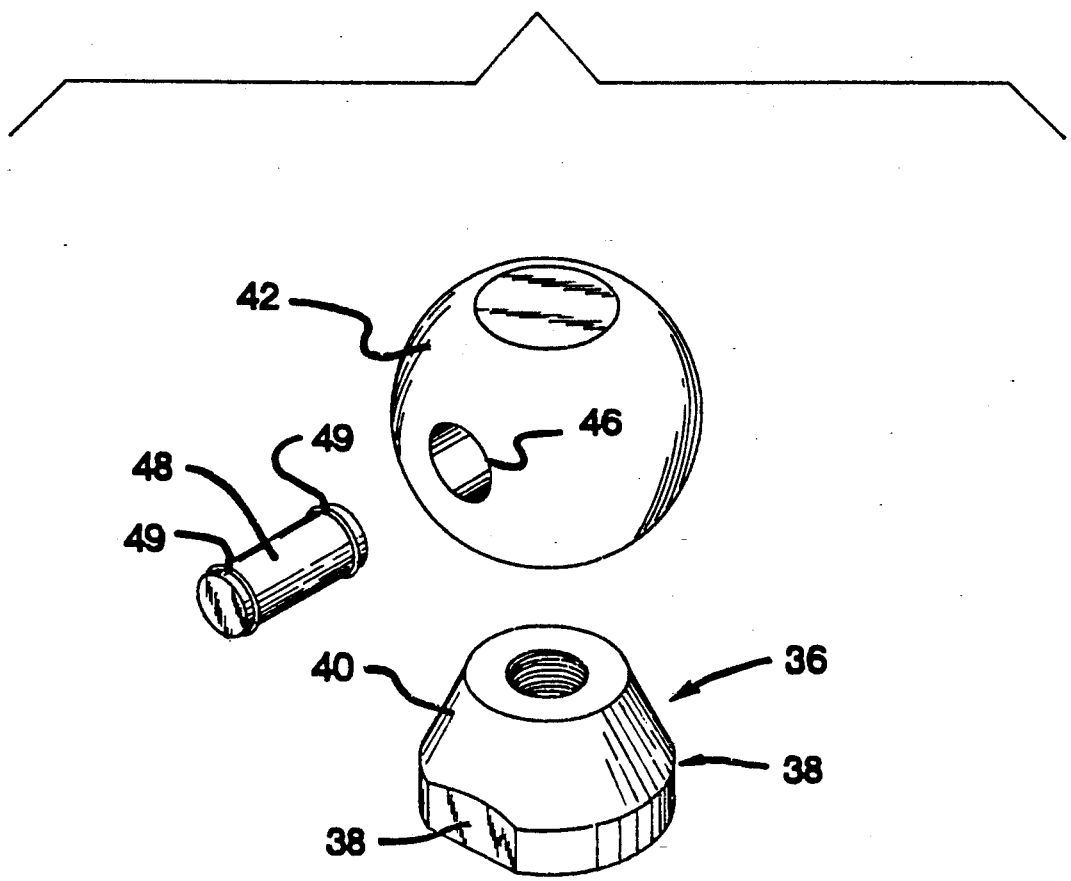
FIG. 1 is a perspective exploded view of the preferred embodiment of the instant invention.
Figure 1:
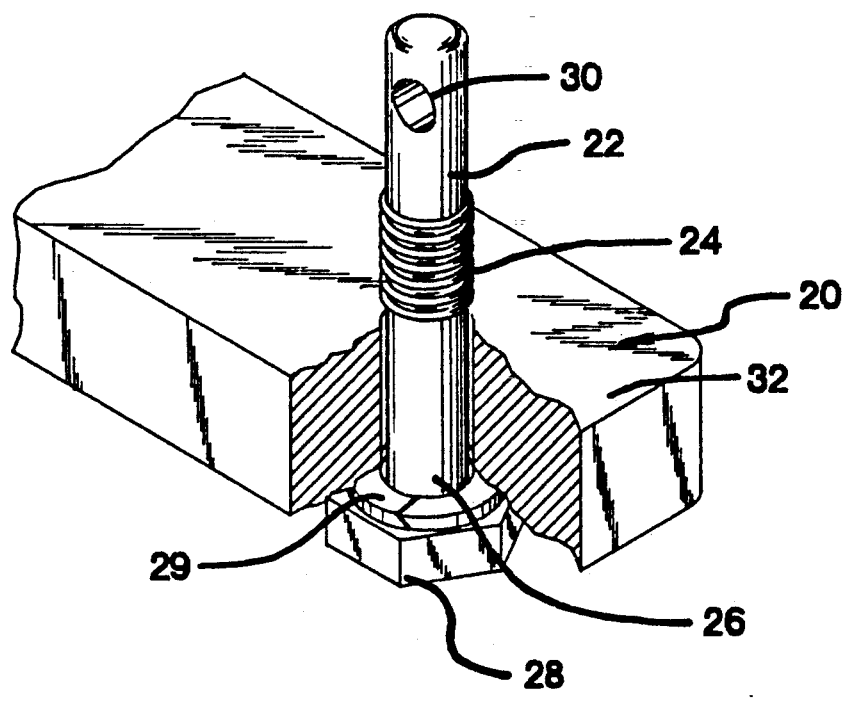
Figure 2:
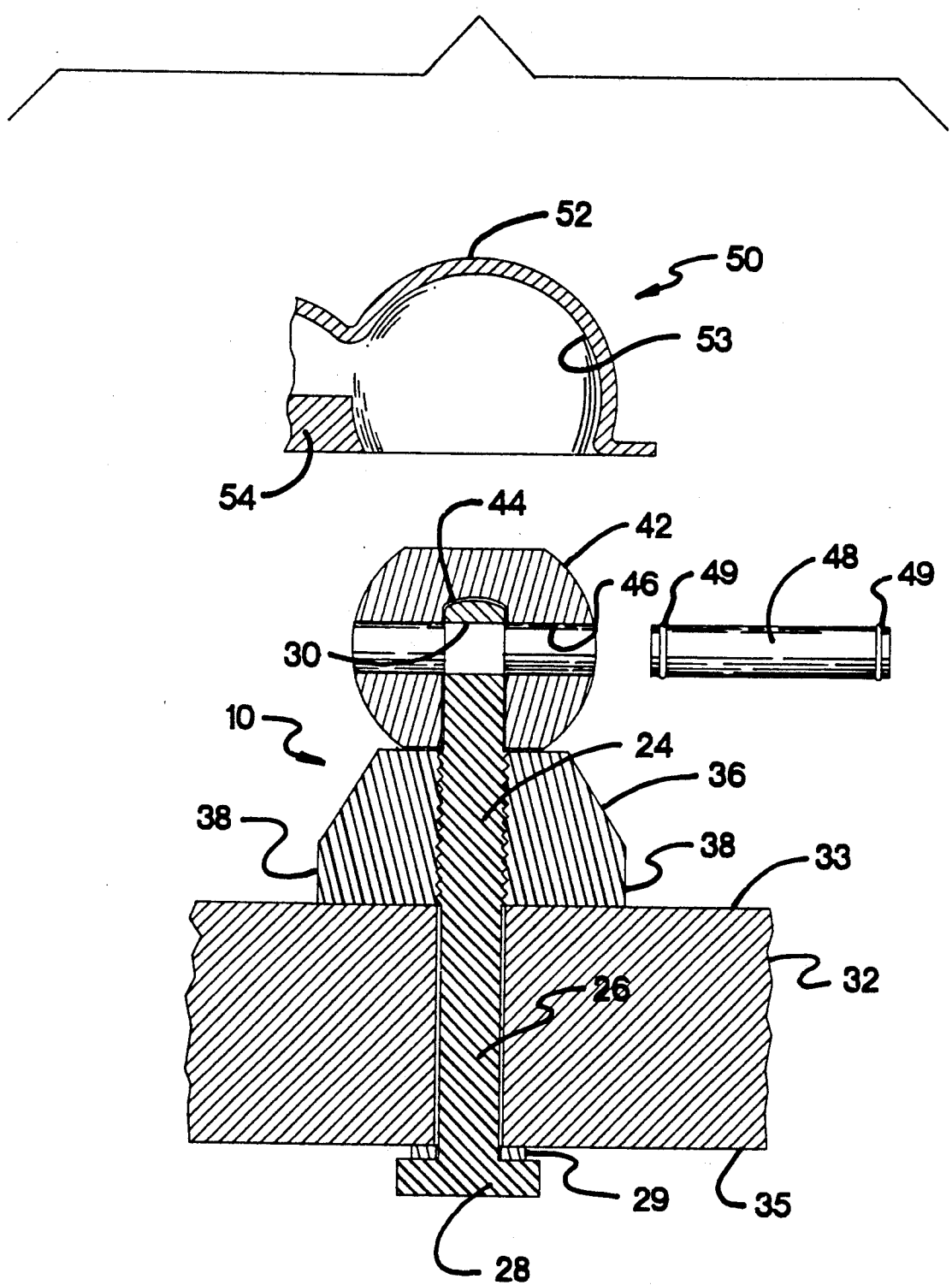
FIG. 2 is a partial exploded elevational cut-away view of the instant invention.

Referring now to the drawings, FIGS. 1 and 2 show an improved ball element 10 of ball and socket-type coupling apparatus comprised of an elongated bolt 20 having an elongate axis of rotation and comprising a non-threaded upper shank portion 22 defining a transverse bore 30 therethrough connected to an intermediate threaded portion 24 which, in turn, is connected to the lower non-threaded shank portion 26. A hexagonal head 28 is connected to the lower shank 26 remote from threaded portion 24. A lock washer 29 may be utilized as is known in the art.

A nut 36 having internal threads is adapted to be threaded upon threaded portion 24 of bolt 20. In the preferred embodiment, nut 36 has tapering sides 40 and planar sides 38 adapted to be engaged by a gripping tool such as a wrench for tightening. When nut 36 is threaded onto threaded portion 24 of bolt 20, the lower end of said nut 36 is adapted to frictionally engage the upper surface 33 of towing vehicle support member 32. Likewise, head 28 of bolt 20, or lock washer 29 if used, is adapted to frictionally engage the lower surface 35 of support member 32. In this way, support member 32 is sandwiched between nut 36 and bolt head 28.

A generally spherical ball member 42 having a partially hollow cavity 44 opening downwardly is adapted to be placed over upper shank 22 of bolt 20. A through aperture 46 in ball 42 is adapted to align with bore 30 of bolt 20 and to thus form a keyway entirely through ball 42. A pin member 48 is adapted to be inserted within said keyway to retain ball 42 against movement relative to bolt 20. Means ma be used to maintain pin 48 in place within said keyway such as resilient O-ring members 49.

It sould be noted that when ball 42 is in place upon upper shank 22 and aperture 46 aligned with bore 30, thus forming said keyway, the lowermost end of ball 42 should be in firm abutting frictional contact with the uppermost end of nut 36. Simultaneously, as previously discussed, the lower end of nut 36 should be in frictional engagement with the upper surface 33 of support member 32. In this way, any attempt to turn bolt 20 via torque applied to head 28 will tend to cause ball 42 to rotate in the same direction due to pin 48 being disposed in the keyway. This tendency in turn causes ball 42 to bear upon nut 36 with a downward component of force, thus creating a static frictional condition. Nut 36 is precluded from rotating and/or moving downwardly, which would permit bolt 20 to loosen, by virtue of its abutting contact with support member 32.

After ball 42 is placed upon upper shank 22 and pin 48 inserted into the keyway, a conventional socket member 50, which is connected to the towed vehicle, is placed in operable association about ball 42. Socket member 50 is comprised of semi-spherical housing member 52 defining a partially spherical inner ball receiving recess 53. A locking member 54 is slidable between the locking and unlocking position as commonly known to lock ball 42 in place relative to socket member 50. Once socket member 50 of the towed vehicle is operably positioned in surrounding relationship about ball 42 and locking member 54 is secured by any convenient locking means, pin 48 cannot be removed and hence the entire ball and socket arrangement is secure against tampering.

It should be noted that lower shank 26 may be threaded consistent with threaded portion 24 if desired.

It can therefore be seen that the instant invention provides an improved coupling wherein the ball structure of a ball and socket coupling cannot be removed from the support member of a towing vehicle while the towed vehicle socket member is placed upon the ball member. Preferably, the material of the ball 42, nut 36, and support member 32 provide a high coefficient of friction. Further, nut 36 may be shaped other than as shown and may be used in connection with a spacer to compensate for situations where support member 32 is of a smaller or larger size.

The instant invention has been shown and described herein in what it is considered to be the most practical and preferred embodiment. It is recognized, however, that departures may be made therefrom within the scope of the invention and that obvious modifications will occur to a person skilled in the art.

What I claim is:

1. An improved ball and socket coupling adapted to provide a tamperproof coupling between a towed vehicle and a towing vehicle, the coupling comprising:

a support member said support member having a bore extending therethrough;

a ball;

a bolt means connecting said ball to said support member, said bolt means having an upper non-threaded shank and a lower non-threaded shank and an intermediate threaded portion, said bolt means having a bolt head non-removably connected to said lower shank remote from said intermediate threaded portion, said upper shank having an aperture extending therethrough transverse to a longitudinal axis of said bolt means;

a nut means separate from said ball, said nut means having threads corresponding with said intermediate threaded portion of said bolt means for meshing with said intermediate threaded portion so as to sandwich said support member between said bolt head and said nut means, said ball having a partially hollow interior opening on a surface facing said support member, said ball further defining a transverse aperture therethrough intersecting said hollow interior at a right angle, said transverse aperture of said ball aligned coaxially with said aperture of said upper shank so as to form a keyway; and pin means extending through said keyway to prevent movement of said ball relative to said upper shank.

2. The ball and socket coupling of claim 1, wherein said ball is generally spherically shaped.

3. The ball and socket coupling of claim 2, wherein the lower shank of said bolt means is disposed through an aperture extending through said support member generally transverse to a longitudinal axis of said support member.

4. An apparatus for joining a socket member of towed vehicle to a towing vehicle comprising:

a support member connected to the towing vehicle, said support member having a bore extending transversely therethrough;

a ball means defining a hollow inner cavity opening on a surface facing said support member, said ball means having a transverse aperture extending through said inner cavity of a right angle;

an elongated bolt member having a non-threaded upper shank portion and an intermediate threaded portion and a lower non-threaded shank portion, said inner cavity positioned on said non-threaded upper shank portion; said lower shank portion being connected to a head remote from said threaded portion, said bolt member extending through said bore in said support member;

an internally threaded intermediate member separate from said ball means, said intermediate member threaded upon said intermediate threaded portion of said bolt member, said intermediate member sandwiched between said ball means and said support member;

a bore formed in said upper shank of said bolt member and aligned coaxially with said transverse aperture of said ball means; and a retaining pin extending through said bore and said transverse aperture of said ball means.

5. The apparatus of claim 4 wherein said retaining pin has an elongate axis disposed in a generally horizontal plane.

6. A theft proof coupling of the ball and socket variety adapted to join a towing and a towed vehicle, wherein the coupling is comprised of:

a support member;

a bolt having an upper shank defining a transverse bore therethrough, said bolt having an intermediate threaded portion, said bolt having a head remote from said upper shank, said head bearing against a bottom surface of support member;

a locking element threadedly engaging said intermediate threaded portion and bearing against an upper surface of said support member, said bolt extending through said support member, said threaded intermediate portion and said upper shank extending above said upper surface of said support member;

a ball means having a partially hollow inner cavity, said inner cavity having an opening facing said support member, said inner cavity shaped to correspond generally to said upper shank, said ball means positioned upon said upper shank, said ball means having an aperture extending therethrough and aligned coaxially with said bore in said upper shank to thereby form a keyway;

a retaining pin extending through said keyway.

7. The theft proof coupling of claim 6, wherein said ball means abuts said locking element.

8. The theft proof coupling of claim 7, wherein said locking element is an internally threaded nut having tool engaging means associated therewith for rotating said locking means into a tightened position relative to said support member.

9. The theft proof coupling of claim 6, wherein said retaining pin is a cylindrical elongated member having means to retain said retaining pin means in position within said keyway against unwanted removal thereof from said keyway.

* * * * *